Patented July 9, 1940

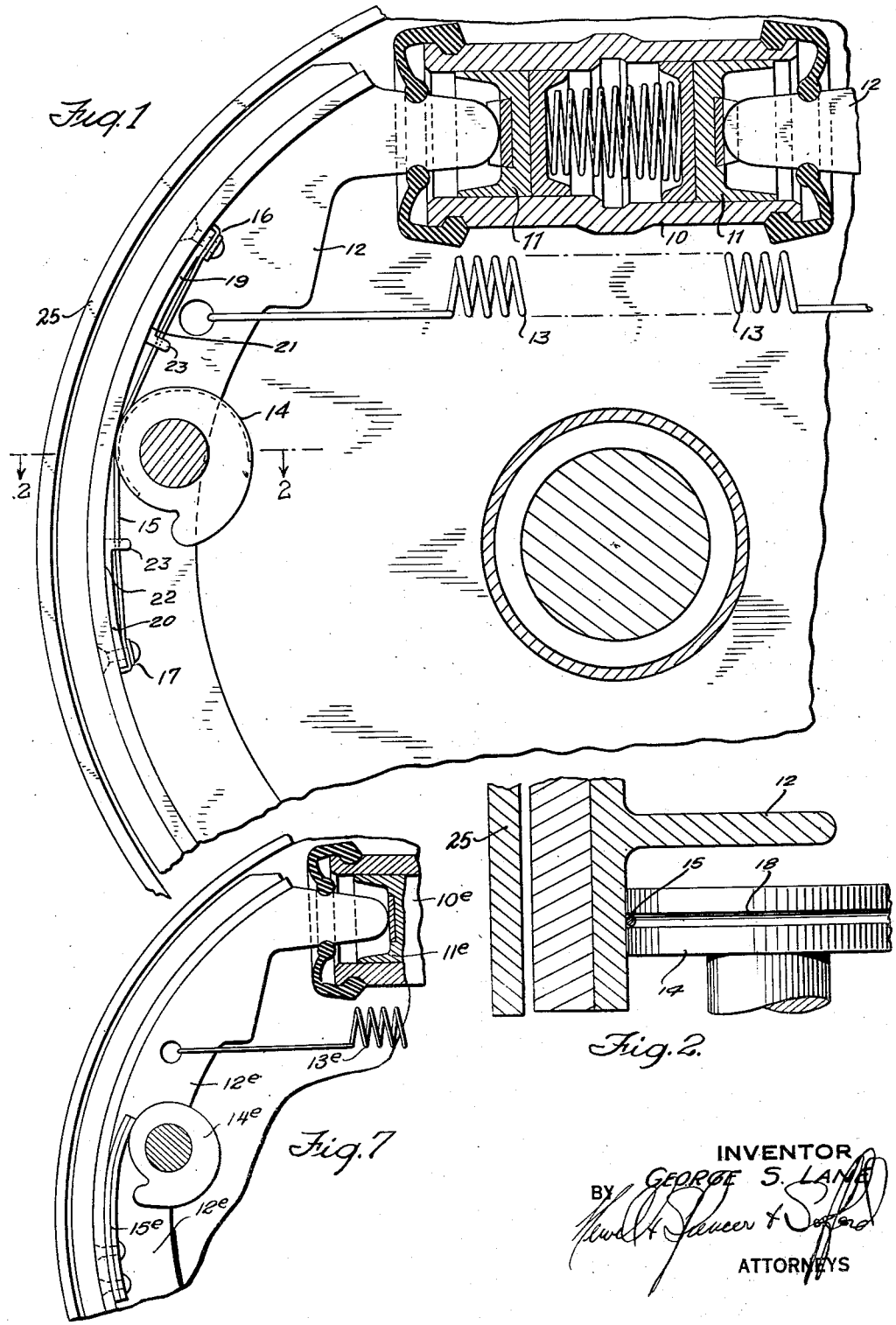

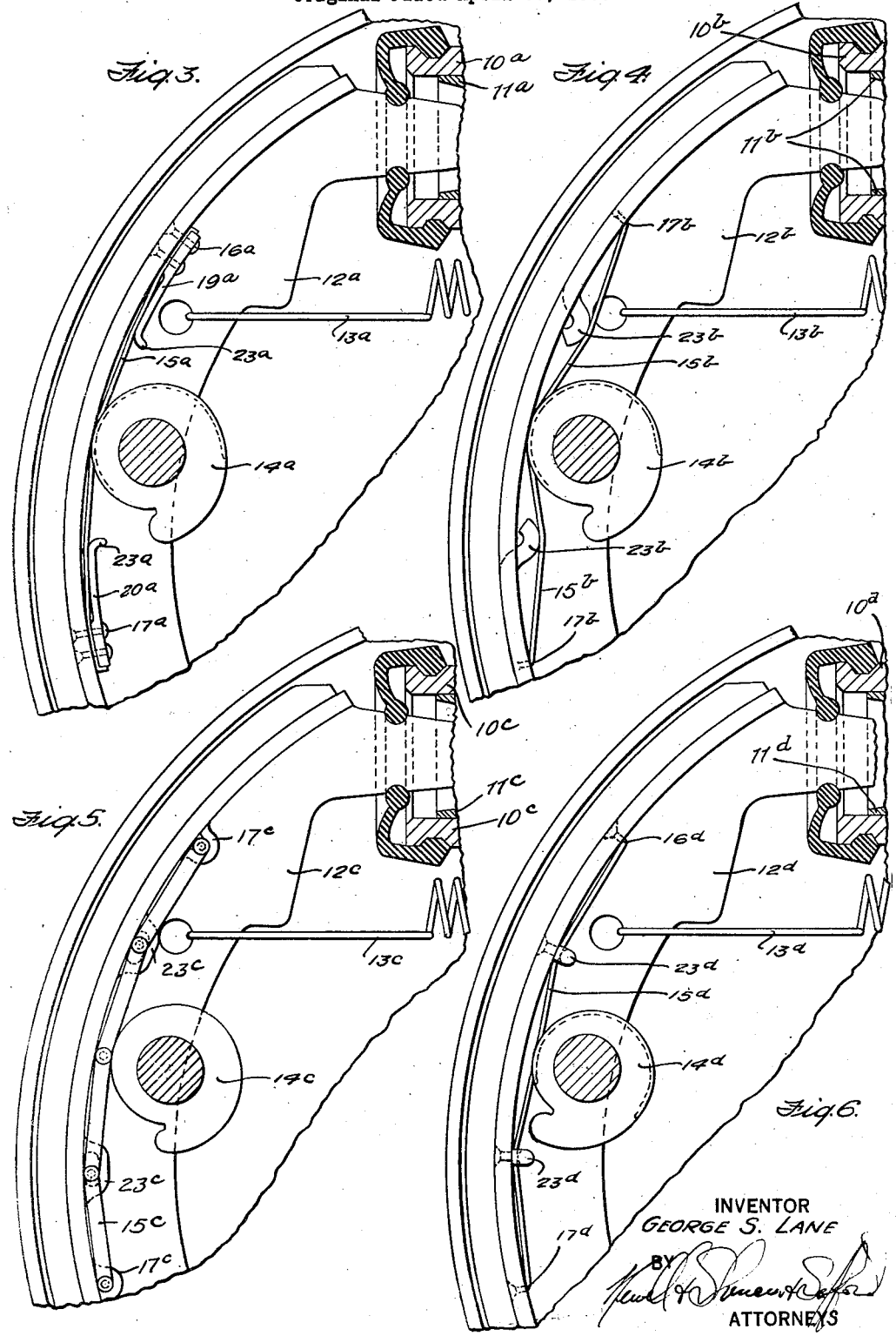

2,207,261

UNITED STATES PATENT OFFICE 2,207,261

BRAKE ADJUSTMENT

George S. Lane, Schenevus, N. Y., assignor to The H. A. Wilson Company, Newark, N. J., a corporation of New Jersey Application April 30, 1936, Serial No. 77,225
Renewed October 11, 1939

11 Claims. (Cl. 188—79.5)

This invention relates to thermostatic devices and more particularly to devices for thermostatic adjustment of vehicle brakes.

In my prior applications, Serial No. 65,049, filed February 21, 1936, and Serial No. 73,703, filed April 10, 1936, I have described and claimed various means for producing temporary adjustment of brake mechanisms to compensate for thermal expansion in the operating parts of the mechanism which results from the production of heat by conversion of energy of momentum.

In those applications I have particularly described such thermostatic devices in combination with automatic take-up devices since this combination makes possible the most effective use of the pedal stroke. These thermostatic devices, however, as is made clear in my said prior applications, can be used to effect temporary adjustment to compensate for thermal expansion alone as well as in conjunction with automatic take-up devices which adjust for wear. In fact if one of these is to be used alone, unless the special relation of my prior application, Serial No. 73,703, is also used, the thermostatic device is more important than the take-up for wear, because wear occurs gradually and the driver is warned of the necessity for adjustment if thermal expansion need not be considered, whereas brakes which seem entirely satisfactory, if not automatically compensated for thermal expansion may fail in an emergency stop from high speed or on a long grade.

In the devices shown in my said prior applications I have proposed the use of such known thermostatic devices as simple expanding members or bimetallic members in which the difference of expansion between two connected strips results in a bending of the strip.

By my present invention I now provide other novel, simple and in other respects very advantageous thermostatic devices which may be used either alone or in combination with automatic take-up devices for wear adjustment.

Accordingly, one object of my invention is to provide improved thermostatic devices. Another object of my invention is to provide an improved thermostatic adjustment for brake mechanism.

In the accompanying drawings I have illustrated a preferred embodiment of my invention and various modifications thereof. This has been chosen with a view to explaining the invention and the principle thereof so that others skilled in the art may be enabled to utilize the invention under varying conditions and in varying forms best adapted to such conditions. It will be understood, therefore, that the invention is not restricted to the particular embodiments shown in the drawings and described below.

In these drawings:

Fig. 1 is a fragmentary view partly in cross section and partly in elevation of a brake mechanism similar to that commonly used in motor vehicles of standard construction, but embodying my present invention.

Fig. 2 is a fragmentary cross section taken on line 2—2 of Fig. 1.

Figs. 3 to 7 inclusive are fragmentary views of modified forms of the invention showing only those portions of the brake mechanism which are changed from that of Fig. 1.

Referring first to Figs. 1 and 2, I have shown therein a brake construction which is similar to that used in standard motor vehicle practice at the present time. The brake operating motor 10 receives fluid under pressure from a brake operating system (not shown) which may be in every respect similar to the present accepted design and which includes the usual means for replenishing the supply of liquid so that the operating stroke is effective throughout its full amplitude. These parts are standard and are shown, for example, in my said prior co-pending applications.

The fluid pressure acts upon the pistons 11 and through them upon the ends of the brake shoes 12. A retracting spring 13 holds the ends of the shoes 12 against the pistons 11 and returns the shoes 12 when the pressure on the pistons is relieved. A stop 14, which in the present case is shown as the usual adjustable stop, limits this return movement of the shoe to a position at which the shoe has only the necessary clearance from the brake drum 24.

According to my present invention, instead of bearing directly against the shoe 12 the adjustable stop 14 contacts with a flexible strip 15 which at its opposite ends is secured to the back of the brake shoe 12 at the points 16 and 17. As shown in the drawings, this strip 15 has at ordinary temperatures sufficient slack so that it assumes a curved or angular position and preferably it has a sufficient length between the points 16 and 17 so that it allows the adjustable stop 14 to contact with the back of the shoe 12 without stretching the strip 15. Thus at ordinary temperatures no strain is placed upon the thermostatic strip 15; and furthermore, the strip is given a substantial angle so that as it tightens it can limit the movement of the shoe 12 with a finite mechanical advantage with respect to the spring 13.

It should be understood that the greater the initial angularity of the strip 15 at the stop 14 the less will be the mechanical advantage of the spring 13 against the strip 15; and in order to further increase this it may in some cases be desirable to provide means to raise the strip 15 away from the shoe 12, e. g., washers or bosses or the strips 19, 20 under the strip 15 so as to increase the angularity of the strip.

The raising of the strip in this way also puts the strip 15 into less intimate heat-exchange relation to the shoe 12 so that there is a lag between these when heating occurs. This is an advantage because it increases the thermostatic action when the brake is strongly heated and thus compensates for the lag which occurs at the same time between the brake drum and the shoe; also because it keeps the strip 15 at a lower temperature than the shoe 12 and thus makes a difference of thermal expansion even without that, due to difference in the coefficients of expansion between the two metals; and finally, when nickel steels are used, because it keeps the maximum temperature below that at which the coefficient of expansion increases sharply.

These effects may be further emphasized by making the strips 19—20 of thermal insulating material, and/or blackening and roughening the exposed face of the strip 15 and polishing its back to make the radiation of heat from the strip more rapid than absorption of heat from the brake shoe.

In the embodiment shown the strips 19 and 20 are welded to the shoe at 21—22 provided at their ends with cross bars 23 which are preferably rounded so as to avoid sharp bending of the strip 15. In this way the difference in expansion of a long strip is concentrated in a relatively short chord where it produces a greater radial movement.

If still greater amplitude of movement should be required the strips 19 and 20 may be made of bimetallic thermostatic metal so as to move the bars 23 outwardly toward the shoe when heated.

In order to prevent the strip 15 from slipping off of the stop 14 the latter may be grooved as shown in Fig. 2, and the sides of the groove of sufficient width so that the strip 15 operates continuously within the groove, i. e., the width of the sides of the groove is equal to the movement of the brake shoe 12 in a single brake operating stroke. Similarly but less advantageously shoulders or other guides on the strip 15 or external guides could be used to hold the desired relation.

In the operation of the device as thus far described the brake normally operates within the limits prescribed by the drum and the face of the stop 14 at the sides of the groove 18. As wear occurs it may be taken up by adjustment of the spiral stop so as to limit the return movement of the shoe 12, and when this is done the piston 11 cannot be returned quite so far by the spring 13 and consequently additional fluid will be fed into the system. The subsequent stroke of the piston 11 will begin from its new position and continue until the lining contacts with the drum in the fully operated position.

If, however, the brake is used in several quick successive stops or on a long drag, as for example down hill, the brake drum may become so far heated as to expand beyond any position reached by the shoe 12 with a normal stroke of the piston 11 unless some adjustment of that stroke is provided. Such adjustment is accomplished according to the present invention by means of the strip 15. The heat which is generated in the brake is principally absorbed by the thermally conductive drum but to a lesser extent is absorbed by the brake shoe itself through its less conductive friction lining. Consequently there is a corresponding but lesser expansion of the brake shoe at the same time that the drum expands.

Since, however, the strip 15 does not substantially expand or does not expand at the same rate as the brake shoe it will be drawn more tautly between the points of connection 16 and 17 and will no longer have sufficient length between these points to permit the contact between the shoe 12 and the stop 14.

In this new relationship the return movement of the brake shoe 12 will be limited by the strip 15 coming against the bottom of the groove 18 and thus the piston 11 will again be held against full return to its normal position and additional liquid will be allowed to enter the system. Upon the following stroke of the piston it will start from a more advanced position and consequently the brake shoe 12 will be able to contact the drum notwithstanding the expansion which has occurred as a result of the previous braking operation.

In addition to the action resulting from the differences in coefficient of thermal expansion between the strips and the brake shoe there is another action which supports the thermostatic effect, which has already been suggested above, namely, that due to its position the strip 15 will remain at a lower temperature than the shoe and thus even if it were of the same material as the brake shoe it would expand less than the brake shoe.

It is an advantage of this thermostatic regulation that if the heating of the shoe 12 lags behind the heating of the drum so as to occur after the braking operation is completed and the shoe has been released, nevertheless, the same adjustment will occur. As the shoe 12 expands the strip 15 will be drawn more taut and the shoe, therefore, will be actually moved to a more advanced position against the force of the spring 13. When this occurs the pistons 11 will be moved by its spring to follow the shoe 12 and consequently additional liquid will be fed into the system and the subsequent stroke will begin at this more advanced position. Correspondingly when the brake cools, after reaching a high temperature requiring such thermostatic adjustment, the strip 15 will be relaxed and the brake shoe 12 gradually returned to its normal position by the pressure of the spring 13 and as a consequence there will at no time be any dragging of the brake whether or not it may be operated while the temperature changes occur.

Another advantage of this device as described above and as shown in Figs. 1 and 2 is that the operativeness of the brake system is not dependent upon any of the parts which are added according to the present invention. If these parts should be completely broken away the brake would still be operative in exactly the same way as if the thermostatic adjustment had not been provided.

A very important advantage of the use of the invention is that it permits greater utilization of the pedal stroke for actual effective brake operation. Even without an automatic take-up device for wear, a much longer part of the pedal stroke can be assigned to actual braking because no part of the stroke need be reserved for thermal expansion which would occur upon emergency stops from high speed or upon dragging the brakes on a long grade.

The strip 15 should, as will readily be understood, be of a material which is tough, relatively flexible with high fatigue resistance, but relatively incapable of stretching, and which has as low a coefficient of thermal expansion as possible. The materials best suited to this purpose, so far as I have found, are the ferro-nickel alloys and especially those having less than 50% Ni. The 53.8 Fe, 36 Ni, 0.2 C alloy, known as invar metal which has the lowest coefficient of thermal expansion (only 2 or $3 \times 10^{-7}$) within the range of atmospheric temperatures; but in higher temperature ranges a higher percentage of nickel is better, e. g., up to 40% Ni or even a little higher.

It is an advantage of these nickel steels that above a given temperature the coefficient of expansion increases rapidly up to or even above that of the steel of which the brake shoe is made. Thus if the shoe should for any reason become excessively overheated the strip will be pulled taut to the desired extent, but beyond that will only hold the same degree while the strip and the shoe expand at substantially the same rate. Thus any tendency to serious distortion of the shoe or rupture of the strip upon excessive heating is avoided.

Instead of the wire as shown in Fig. 2, a thin strip or other suitable shape can, of course, be used. In order to assure that no slippage of the strip 15 will occur at the points 16 and 17 it is preferably welded at these points to the shoe and as additional precaution may also be riveted as shown, and/or bent over the ends of the strips 19, 20, or into a hole in the shoe.

In Fig. 3, I have shown an inverted arrangement as compared with that shown in Fig. 1. In this case the strips 19a and 20a are secured over the strip 15a and are formed with rounded ends 23a which serve the same function as the cross bars 23 in Fig. 1. Beyond the point of attachment 17a the strips 19a and 20a are cut back slightly so as to allow freedom for expansion and contraction of the strip 15a.

In the modification illustrated in Fig. 4 a projection 23b is turned up from the shoe at a distance from the point of attachment 17b. Thus the effective curve or angle of the strip 15b is between the projection 23b whereas the effective length of the strip over which the difference in expansion is effective is between the points of attachment 17b. The attachment 17b, in this case, is made by drilling or punching the shoe and inserting a bent over portion of the strip 15b. This is preferably spot-welded into place or its ends may be clinched or riveted on the opposite side of the shoe.

In Fig. 5, I have shown an embodiment of my invention adapted for use with a heavier metal which is not sufficiently flexible for the arrangements shown in the other figures. In this case the strip 15c is articulated by means of hinges 25 and 26 preferably welded to prevent pulling out, and is attached to the shoe at points 17c. An anchor slide 23c engages the end of the hinge pin 25 and thus serves substantially the same function as the cross bar 23 or the ends 23a of the strip shown in Fig. 3.

In Fig. 6 I have shown the converse arrangement of that illustrated in the Figs. 1 to 5 inclusive. In this case, instead of using a metal of low thermal expansion, I have used a strip 15d of high thermal expansion anchored to the shoe at the points 17d and 16d and slidably engaged under the cross bars 23d. Between these cross bars the strip is buckled backward from the shoe and the extent of this buckle increases as the temperature increases because of the difference in expansion between the strip and the shoe. In this case the outer face of the strip 15d should be polished and/or covered with thermal insulating material while the inner surface should be roughened and/or darkened in as intimate heat exchange relation as possible to the brake shoe.

In Fig. 7, I have shown a simple bimetallic thermostatic member 15e secured to the brake shoe so that upon heating it curls back from the shoe. As shown this member should be of heavy metal so that it can withstand the retracting force of the spring 13 (shown in Fig. 1) and hold the brake shoe at the more advanced position required for proper adjustment to compensate for thermal expansion. The bimetallic thermostat 15e is representative of numerous types of thermostats well known to those skilled in the art. Liquid, solid and gaseous expansive members could be used between the shoe and stop, including bellows and diaphragm devices. Liquid and solid expansion, however, is much to be preferred over gaseous devices, because the quality of incompressibility makes possible a more certainly determined stop.

Although I have shown my invention as applied to a hydraulic braking system, because this type of system is now almost universally accepted by designers, it will be understood, nevertheless, that it can be applied also to any other type of system provided with means for automatically taking up slack in the system so that each stroke begins at once from the then position of the brake shoe. Furthermore, although I have shown this in conjunction with a fixed or manually adjustable stop 14, it will be understood that this or any other type of stop can be provided with means for automatic adjustment to compensate for wear, for example as shown in my said co-pending applications; or any other automatic take-up device could be used.

I have shown in the drawings the strip 15 applied to the concave portion of the shoe because that portion is subjected to the strongest heating and it allows the strip 15 to bend to an angle over the stop 14. This device, however, can be used on any member provided that there is sufficient room to bend the strip 15 over the stop 14 or its equivalent between the points of attachment. Thus by making the bosses at 16 and 17 sufficiently high, a similar arrangement could be used with either a straight or a convex member and, of course, where the strip is to act in an opposite direction so that it can be bent away from the member to which it is attached the shape of the latter member is of even less importance.

It should be understood that the degree of action which is secured by this construction shown in Figs. 1 to 6 depends upon the length of the strip 15 and the distance between the points 16—17. I have found that with standard brake construction such as shown in the drawings and an invar metal strip as shown in Fig. 1, a length of about four inches will be sufficient. In this case the shoe temperature rises to a maximum of about 200° F. while the drum temperature rises to a maximum of about 800° F. and within this range I have found that the four inch length of invar strip with an ordinary steel shoe provides the necessary thermostatic adjustment to keep the shoe in satisfactory operative relation to the drum. Of course, if a metal having a high thermal expansion is used in place of the usual steel for the brake shoe 12 a shorter length of the strip 15 could be used and conversely if a material having a lower coefficient of expansion should be used a greater length of strip might be required.

I claim:

1. In a brake system comprising a part heated by energy converted in the braking action, and a brake operating system, a thermostatic adjusting device which comprises a flexible strip of material having a coefficient of thermal expansion substantially lower than that of the heated part, rigidly secured at its opposite ends to said heated part and of length between said points of attachment, when below the temperature of thermostatic response, greater than the straightline distance between said points, whereby said strip takes a curved form, and means controlling the brake adjustment engaged by said strip between said points of attachment and on the concave side thereof, whereby upon expansion of the heated means the strip is pulled taut against said adjustment controlling means.

2. A hydraulic brake mechanism of the type having an internal friction shoe and a brake operating system including means for readjusting the system after each operation so that the succeeding operation will be effective for the full stroke regardless of the extent to which the shoe returns, and a stop for limiting the return of the shoe, which is characterized by a thermostatic adjusting device responsive to heating of the shoe which comprises a flexible strip of a material having a lower coefficient of expansion than the shoe, connected at opposite ends to the shoe and being curved when at temperatures below the maximum adjusting temperature, with its concave side engaging the stop on the return stroke of the shoe, whereby upon heating of the shoe the strip will be pulled more taut and will engage said stop at an earlier position.

3. The brake mechanism as defined in claim 2 in which the strip is of invar metal and is secured directly to the back of the shoe.

4. A brake mechanism of the type having an internal friction shoe and a brake operating system including a fluid pressure motor for operating said shoe and having a piston stroke capacity sufficient to accommodate wear of the shoe, means for readjusting the fluid pressure in the system after each operation so that the succeeding operation will be effective for the full stroke regardless of the extent to which the motor piston returns, and a stop for limiting the return of the shoe and the motor piston connected thereto, which is characterized by a thermostatic adjusting device responsive to heating of the shoe which comprises a flexible strip of a material having a lower coefficient of expansion than the shoe, connected at opposite ends to the shoe and being curved when at temperatures below the maximum adjusting temperature, with its concave side engaging the stop on the return stroke of the shoe, whereby upon heating of the shoe the strip will be pulled more taut and will engage said stop at an earlier position.

5. In a braking apparatus, the combination of a brake drum, a shoe, means for retracting the shoe from the drum, means for moving the shoe into contact with the drum to produce a braking action, and means for limiting the retractile position of the shoe relative to the drum including an adjustable stop and a member interposed between the shoe and the stop, the member having a coefficient of thermal expansion different from that of the shoe and being operable to shift the retracted shoe toward the drum upon an increase in temperature.

6. In a braking apparatus, the combination of a brake drum, a shoe, means for retracting the shoe from the drum, means for moving the shoe into contact with the drum to produce a braking action, and means for limiting the retractile position of the shoe relative to the drum including an adjustable stop and thermostatic means interposed between the stop and shoe and operable to shift the retracted shoe toward the drum upon an increase in temperature.

7. In a braking apparatus, the combination of a brake drum, a shoe, means for retracting the shoe from the drum, means for moving the shoe into contact with the drum to produce a braking action, and means for limiting the retractile position of the shoe relative to the drum including an adjustable stop and a thermostatic element interposed between the shoe and stop and operable to shift the retracted shoe toward the drum upon an increase in temperature.

8. In a braking apparatus, the combination of a brake drum, a shoe, means for retracting the shoe from the drum, means for moving the shoe into contact with the drum to produce a braking action, and means for limiting the retractile position of the shoe relative to the drum including an adjustable stop and a bimetallic element interposed between the shoe and stop and operable to shift the retracted shoe toward the drum upon an increase in temperature.

9. In a braking apparatus, the combination of a brake drum, a shoe, means for retracting the shoe from the drum, means for moving the shoe into contact with the drum to produce a braking action, and means for limiting the retractile position of the shoe relative to the drum including an adjustable stop and a bimetallic element mounted on the shoe and engaging the stop to determine the retracted position of the shoe, the element being operable to shift the retracted shoe toward the drum upon an increase in temperature.

10. In a braking apparatus, the combination of a brake drum, a shoe, means for retracting the shoe from the drum, means for moving the shoe into contact with the drum to produce a braking action, and means for limiting the retractile position of the shoe relative to the drum including a stop and a member interposed between the shoe and the stop, the member having a coefficient of thermal expansion different from that of the shoe and being operable to shift the retracted shoe toward the drum upon an increase in temperature.

11. In a braking apparatus, the combination of a brake drum, a shoe, means for retracting the shoe from the drum, means for moving the shoe into contact with the drum to produce a braking action, and means for limiting the retractile position of the shoe relative to the drum including a stop and thermostatic means interposed between the shoe and the stop and operable to shift the retracted shoe toward the drum upon an increase in temperature.

GEORGE S. LANE.